(12) United States Patent
Fritsch et al.

(10) Patent No.: US 9,435,885 B2
(45) Date of Patent: Sep. 6, 2016

(54) ROAD-TERRAIN DETECTION METHOD AND SYSTEM FOR DRIVER ASSISTANCE SYSTEMS

(75) Inventors: Jannik Fritsch, Mühlheim (DE); Tobias Kühnl, Frankfurt (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 331 days.

(21) Appl. No.: 13/558,407

(22) Filed: Jul. 26, 2012

(65) Prior Publication Data

US 2013/0079990 A1   Mar. 28, 2013

(30) Foreign Application Priority Data

Sep. 28, 2011  (EP) .................................... 11183057

(51) Int. Cl.
| | |
|---|---|
| G06K 9/00 | (2006.01) |
| G01S 13/89 | (2006.01) |
| B62D 6/00 | (2006.01) |
| G01S 15/93 | (2006.01) |
| G01S 17/89 | (2006.01) |
| G01S 17/93 | (2006.01) |

(Continued)

(52) U.S. Cl.
CPC .............. *G01S 13/89* (2013.01); *B62D 6/007* (2013.01); *G01S 13/93* (2013.01); *G01S 15/89* (2013.01); *G01S 15/93* (2013.01); *G01S 17/89* (2013.01); *G01S 17/93* (2013.01); *G06K 9/00798* (2013.01); *G06T 7/0081* (2013.01); *G06T 7/0087* (2013.01); *G06T 2207/20081* (2013.01); *G06T 2207/30256* (2013.01)

(58) Field of Classification Search
None
See application file for complete search history.

(56) References Cited

U.S. PATENT DOCUMENTS

| | | | |
|---|---|---|---|
| 6,212,453 B1 | 4/2001 | Kawagoe et al. | |
| 6,711,293 B1 | 3/2004 | Lowe | |

(Continued)

FOREIGN PATENT DOCUMENTS

| | | |
|---|---|---|
| EP | 1378855 A2 | 1/2004 |
| EP | 2339375 A2 | 6/2011 |

(Continued)

OTHER PUBLICATIONS

Schmuedderich et al., System approach for multi-purpose representations of traffic scene elements, Sep. 19-22, 2010, IEEE 13th International Conf. on Intelligent Transportation Sys., pp. 1677-1684.*

(Continued)

*Primary Examiner* — Jason Heidemann
(74) *Attorney, Agent, or Firm* — Squire Patton Boggs (US) LLP (57) ABSTRACT

The present invention describes a road terrain detection system that comprises a method for classifying selected locations in the environment of a vehicle based on sensory input signals such as pixel values of a camera image. The method comprises a high level spatial feature generation for selected locations in the environment called base points. The spatial feature generation of the base points is based on a value-continuous confidence representation that captures visual and physical properties of the environment, generated by so called base classifiers operating on raw sensory data. Consequently, the road terrain detection incorporates both local properties of sensor data and their spatial relationship in a two-step feature extraction process.

22 Claims, 11 Drawing Sheets

(51) Int. Cl.
   *G01S 13/93* (2006.01)
   *G01S 15/89* (2006.01)
   *G06T 7/00* (2006.01)

(56) References Cited

U.S. PATENT DOCUMENTS

| | | | |
|---|---|---|---|
| 6,819,779 B1 * | 11/2004 | Nichani | 382/104 |
| 7,092,075 B2 * | 8/2006 | Singh et al. | 356/4.01 |
| 7,151,996 B2 | 12/2006 | Stein | |
| 7,272,474 B1 * | 9/2007 | Stentz et al. | 701/26 |
| 8,421,859 B2 * | 4/2013 | Zhang et al. | 348/119 |
| 8,487,991 B2 * | 7/2013 | Zhang et al. | 348/119 |
| 2004/0138831 A1 * | 7/2004 | Watanabe et al. | 702/33 |
| 2007/0198146 A1 | 8/2007 | Ikeda et al. | |
| 2009/0167864 A1 * | 7/2009 | Unoura | 348/148 |
| 2009/0295917 A1 | 12/2009 | Zhang et al. | |
| 2010/0017060 A1 * | 1/2010 | Zhang et al. | 701/41 |
| 2010/0079590 A1 * | 4/2010 | Kuehnle et al. | 348/118 |
| 2010/0097455 A1 * | 4/2010 | Zhang et al. | 348/119 |
| 2010/0183192 A1 * | 7/2010 | Fritsch et al. | 382/103 |
| 2010/0295668 A1 | 11/2010 | Kataoka | |
| 2010/0305857 A1 * | 12/2010 | Byrne et al. | 701/301 |
| 2011/0044503 A1 | 2/2011 | Sato | |
| 2011/0063097 A1 | 3/2011 | Naka et al. | |
| 2011/0187863 A1 | 8/2011 | Glander et al. | |
| 2011/0293141 A1 * | 12/2011 | Robert | G06K 9/00785 382/103 |
| 2012/0050074 A1 * | 3/2012 | Bechtel et al. | 340/988 |
| 2012/0288206 A1 * | 11/2012 | Yoshimi | 382/202 |
| 2013/0085642 A1 * | 4/2013 | Dankers | 701/48 |
| 2013/0136306 A1 * | 5/2013 | Li et al. | 382/103 |

FOREIGN PATENT DOCUMENTS

| | | | |
|---|---|---|---|
| EP | 2348485 A1 | 7/2011 | |
| JP | 2007-004669 A | 1/2007 | |
| JP | 2008-262333 A | 10/2008 | |
| WO | WO02/30717 A1 | 4/2002 | |
| WO | WO2010/032532 A1 | 3/2010 | |
| WO | WO2010/083971 A1 | 7/2010 | |

OTHER PUBLICATIONS

H. A. Mallot, et al., "Inverse Perspective Mapping Simplifies Optical Flow Computation and Obstacle Detection," Biological Cybernetics 64, 1991, pp. 177-185.

Kevin Smith, et al., "Fast Ray Features for Learning Irregular Shapes," ICCV 2009, 8 pp.

Tobias Kühnl, et al., "Monocular Road Segmentation Using Slow Feature Analysis," in Proc. IEEE Intelligent Vehicles Symposium, Jun. 5-9, 2011, pp. 800-806.

European Search Report dated Dec. 2, 2011 corresponding to European Patent Application No. 11183057.6.

U. Handmann et al., "Scene Interpretation and Behavior Planning for Driver Assistance," Proceedings of the SPIE, The International Society for Optical Engineering SPIE, vol. 4023, Jan. 1, 2000, pp. 201-212, XP002500734.

* cited by examiner

◯ = Absorption

ROAD-TERRAIN DETECTION METHOD AND SYSTEM FOR DRIVER ASSISTANCE SYSTEMS

The present invention discloses a road-terrain detection method and a road-terrain detection system for driver assistance systems. Such driver assistance systems may be part of a car, bike, scooter or any other road vehicle.

FIELD OF THE INVENTION

The invention is in the field of driver assistance based on computer vision and machine learning. The invention can in particular be implemented in a sensor-based computing module, which can be part of a car, a motorbike, or any other land-based vehicle. The invention can be applied in realistic real-world traffic environments, such as e.g. encountered when driving a car in an unconstrained inner-city scenario.

In modern vehicles a human driver is often assisted by "active safety systems". Such active safety systems (in the following also referred to as "driver assistance systems"), which can e.g. be a lane keeping assistance system as described in U.S. Pat. No. 6,212,453 B1, physically sense the environment of the vehicle and extract information that is necessary for performing the driver assistance function. Based on this sensor signal processing the driver assistance system outputs a signal which can be fed to visual and/or acoustic representations means, or it can be fed to an actor (steering, brakes, safety belt pre-tensioning, airbag, . . . ) the action of which alters the state of the vehicle.

A first type of such information on the environment of the vehicle that is highly relevant for driver assistance systems is the "road terrain". The road terrain in the context of the present invention is understood as the type of surface of the road, over which the vehicle drives or can potentially drive. The road terrain is thus a part of the environment that is semantically important for the task of driver assistance. The road terrain includes—on a coarse level—also sidewalks and traffic islands.

A second type of information about the environment of the vehicle that is important for driver assistance systems are surrounding objects. Such surrounding objects, which a vehicle in a typical road scenario encounters, are often elevated so that they cannot be driven over. Such elevated objects are e.g. other vehicles, cars or buildings, and are considered in the present invention as "non-road terrain".

Identifying a specific road terrain category by the above types of information can in general be performed with a variety of sensors providing, for example, camera images, depth information or GPS/map data.

STATE OF THE ART

Existing driver assistance systems operate mainly on highways and identify an ego-lane, which is the lane the vehicle currently drives on, based on lane markings (e.g. US 20070198146 A1, JP2007004669 A, US 2011044503 A1).

For advanced support at construction sites on highways elevated elements (e.g. barriers, signal boards) can be extracted by using stereo cameras or radar, in order to identify the free driving space (US 2011187863 A1).

More recently, also smaller elevations, like e.g. curbstones were considered (US 20110063097 A1). However, such detection methods require a depth sensor and are restricted to very specific settings, like e.g. a clearly visible curbstone in a short distance.

Besides such delimiting structures as lane markings or elevated objects, also obstacles on the side of the road can be used as delimiters of the driving space, which is particularly useful in the inner city (US 20100295668 A1).

For estimating the road shape in far distance also the use of static objects has been proposed (WO 2010032532).

However, a detection that is based only on such delimiting elements of the lane/road can be erroneous, because the lane markings and curbstones are sometimes hard to detect. Some approaches therefore tackle this problem by incorporating a cascade of decisions, in order to catch also delimiters that are hard to detect (JP 2008262333 A).

Further, a fusing of information about the lane/road path from different sensors, such as cameras, radars and map data can lead to an increased reliability of the detection results, because of complementary sensing characteristics (US 2009295917 A1).

All of the above-described state of the art approaches that use such delimiting elements aim at extracting some parameterized description of the road or lane, like, e.g. the curvature, the width, or the length of a clear road ahead. To this end, road models (e.g. U.S. Pat. No. 7,151,996 B2) can be used for the extraction and the adaptation of the parameters to the current shape of the drivable space.

Besides the above-described delimiting elements, such as curbstones and lane-markings, visual or physical properties of the road surface can deliver further information about the road terrain.

For example, the elevation over ground that is obtained from 3D data can be used to classify the road surface by taking the planarity and the height of a part of the environment into consideration (WO 2010083971 A1).

Also visual aspects like the typical property of asphalt to be texture-less can be used for inferring the drivable surface area (e.g. US 2009295917 A1 or also 'T. Kuehnl, F. Kummert, J. Fritsch, "Monocular Road Segmentation using Slow Feature Analysis", in *Proc. IEEE Intelligent Vehicles Symp.*, 2011'). The obtained surface information can be converted into a parameterized road description for the use in model-based road detection approaches (e.g. U.S. Pat. No. 7,151, 996 B2).

Alternatively to a parameterized road description, the information about the road surface can be used directly as a spatial representation. For example, the free space in front of the vehicle can thus be represented (EP 2339375 A2).

While parameterized road models are primarily useful for e.g. a lane keeping assistance, a spatial representation allows more advanced functions, like e.g. predicting the width of the driving corridor ahead, if a vehicle on the neighboring lane occludes the lane markings of the own lane (EP 2339375 A2). This is an example where the state of the art approaches that are solely based on the detection of delimiting elements are insufficient.

TARGET OF THE INVENTION

The target of this invention is to provide a method and system for detecting road terrain information that improves the driver assistance systems of the existing prior art.

For one thing the existing driver assistance systems as described above rely on very specific scene elements, like e.g. lane markings to identify the ego-lane. The road shapes are assumed to follow a simple shape model with restricted curvature. The detection of scene elements is performed largely in isolation, i.e. only very specific spatial relations of environmental properties are considered in the detection process. For example, two lane markings have to have a horizontal distance of roughly 3.5 m.

One target of this invention is therefore a road terrain detection system with the ability to detect road terrain categories by using a more advanced extraction of the spatial layout of environmental properties.

In order to overcome these drawbacks, the invention proposes:
To capture local properties of the environment of the vehicle in a value-continuous spatial representation, the local properties including
Physical properties like elevation,
Visual properties like color, texture, etc.
To incorporate a spatial layout for classifying individual positions in the environment. For example, the relative distance and/or orientation of a position to physical and visual properties of the surrounding positions.

The invention further targets to improve the above-mentioned existing driver assistance systems by handling aspects that are not covered by these state of the art systems and methods, namely:
Arbitrary road/lane shapes that are e.g. encountered in inner cities.
Arbitrary road/lane boundaries that delimit the road-like area, e.g.
lane markings
poor quality lane markings
curbstones (without lane markings)
transitions to off-limits terrain like, e.g., grass, cobble stones, etc.
transitions to non-road terrain like, e.g., parked cars, buildings, etc.

Another disadvantage of the above-described prior art is the use of a decision process on sensor data, in order to infer directly the existence of delimiting elements and/or road surface properties.

The present invention proposes as an improvement a road terrain detection system that represents both the properties of the road surface and the delimiting elements in value-continuous spatial representations, without taking a hard decision. On such a value-continuous representation, spatial features are calculated that incorporate the properties of the spatial environment. It is only after this two-step feature extraction process that a decision for a road terrain is taken based on the spatial features, which reflect implicitly both the properties and their spatial layout.

Using the integrated two-step process of property extraction and spatial feature generation before performing a classification is superior to the existing prior art, because the information loss can be reduced. In the two-step approach of the present invention, all physical and/or visual properties are still represented in an enriched value-continuous format, which enables the final decision process to deliver an increased detection quality. In contrast, in the prior art a decision is taken based on the properties only, i.e. independent of the spatial layout, which is analyzed in a separate step. Thus, information is lost after the first processing step, while the proposed invention retains this information in a value-continuous format making it available for the decision process after the second step of spatial feature generation.

A spatial layout of properties helps for any classification task where there is a clear structural correspondence of properties at specific spatial locations.

For example, an area where a lot of work has been done on capturing such structural correspondences, by e.g. using scale invariant features (U.S. Pat. No. 6,711,293 B1), is the detection of objects in images. The spatial layout of edge orientations forming the distinct body parts of a human (e.g. arms, legs or head) allows for a better detection of the human (EP 2348485 A1) compared to using edge orientation without spatial layout.

Similarly, certain elements of the road terrain (e.g. lane markings, asphalt area) follow a spatial composition. The present invention therefore further proposes to capture the spatial layout of visual and physical properties of the road terrain for detecting the road terrain category.

In EP 2348485 A1 a spatial layout is captured by analyzing the properties of neighboring grid positions in a defined grid. Instead of only analyzing the next grid position, also more distant positions along some kind of ray can be analyzed.

In 'K. Smith, A. Carleton, and V. Lepetit "Fast Ray Features for Learning Irregular Shapes", *ICCV,* 2009', ray features are applied on binary images in an object centric fashion to detect biological cells matching a prototypical shape.

To improve the prior art in this respect, the system of the present invention proposes to perform a ray extraction on value-continuous spatial representations for spatial feature extraction. Additionally the extraction strategy of features is modified: In the above paper by K. Smith et al. the features for object shape detection have only to capture object centric properties, starting from a position inside the biological cell. For the proposed road-terrain classification, however, the overall spatial layout is captured, i.e. the rays are not limited to a local environment.

A further disadvantage of the state of the art systems and methods is that the parameters for road detection are usually hand-coded. Hand-coding is a time-consuming and error-prone process. Furthermore, hand-coding prohibits the handling of more complex scenarios, since a large variability is difficult to hand-code. In the existing state of the art approaches (e.g. US 2010/0295668 A1) manually designed road models are moreover used.

Therefore, another target of the proposed invention is to automatically obtain individual parameters of classifier modules in a system that uses machine learning concepts. In the context of machine learning such an automatic parameter determination is called "training". Using machine learning of the spatial road properties based on the spatial feature has not been done before and has several advantages:
The system becomes capable of learning a more complex classification decision. This enables the system to handle a large variety of complex situations like e.g. a vehicle encounters in inner-city.
The capability of error compensation due to the decision being based also on the global spatial layout and not only on local properties is greatly improved. For example, a pot hole in the road could cause a wrong decision that the corresponding road region is non-drivable based on local properties. The system has the capability to capture the overall layout of the road and, therefore, compensate small isolated areas with non-road properties. This enables the system to handle road terrain with inhomogeneities like, e.g., repaired road patches or gully covers.

SUMMARY OF THE INVENTION

In particular, the present invention is directed to a road-terrain detection method for driver assistance systems, wherein the road-terrain detection method comprises sensing the environment of a vehicle with at least one sensor, transforming a sensor signal from the at least one sensor into at least one confidence map of local properties of the environment by using at least one base classifier, generating spatial features for the local properties based on the at least one confidence map, classifying locations in the environment of the vehicle to a certain category of road terrain based on the generated spatial features.

As mentioned above, such a two-step process of property extraction and spatial feature generation before performing a classification is superior to the existing prior art, because the information loss can be reduced.

Preferably, the at least one sensor is one or more cameras, radars, laser scanners or GPS\navigation systems. A fusing of different sensors signals from different sensors can lead to an increased reliability of the detection results.

Preferably, based on the classified locations in the environment a visual or acoustic signal is generated or an effector of the vehicle, such as e.g. a steering wheel, an accelerator, or a brake, is operated. Thus, an improved driver assistance system can be implemented.

Preferably, a specific road terrain such as "road-like area", "drivable road", "ego-lane", "non-ego-lane", "non-drivable road", "sidewalk", "traffic island", or "off-limits terrain" is automatically parameterized by using positive and negative samples, which are given by training regions such as polygons.

Preferably, the method comprises a step of sensory preprocessing for all sensor signals to obtain a common representation of the environment, wherein the sensory preprocessing is preferably an inverse perspective mapping of a camera image to get a metric image representation. The efficiency and reliability of the detection results can be increased with the preprocessing.

Preferably, the generation of a spatial feature for a specific location in the environment of the vehicle comprises extracting a ray, wherein a ray is defined as a directed line with a certain angular orientation starting from the location in the environment, and analyzing confidence values along the ray to extract spatial feature.

This specific generation process is very efficient for computing spatial features.

Preferably the analysis of the confidence values along the ray is performed by integrating the confidence values along the ray, and extracting the ray length, at which the integral exceeds an absorption threshold, which is a certain numeric value.

Preferably, for a specific location in the environment at least one ray and at least one absorption threshold is used to generate a feature vector that encodes the relative position to a local property given by a confidence map.

Preferably, the method comprises a base classifier for visual boundary classification, in order to find visual features that discriminate a road boundary, such as curbstones, from a road-like area, wherein the method includes feature generation such as color, texture, appearance, flow, and depth uses a positive training set with polygonal training regions for the road boundary uses a negative training set with polygonal training regions for road-like area excluding areas with lane-markings.

Preferably, the method comprises a base classifier for road classification that generates a confidence map, wherein locations in the environment that correspond to a road-like area have high confidence values.

Preferably, the method comprises a base classifier for lane marking detection that generates a confidence map, wherein locations in the environment that correspond to lane markings have high confidence values.

The present invention is further directed to a road-terrain detection system for driver assistance systems, the road-terrain detection system being adapted to perform a method according to any of the embodiments described above.

The present invention is further directed to a road-terrain detection system for driver assistance systems, the road-terrain detection system being adapted to sense with at least one sensor the environment of a vehicle, transform at least one sensor signal from at least one sensor into at least one confidence map of local properties of the environment by using at least one base classifier, generate spatial features for local properties based on the at least one confidence map, classify locations in the environment of the vehicle to a certain category of road terrain based on the generated spatial features.

Preferably, the road terrain detection system can select one out of multiple road terrain classification outputs as a system output, in order to internally have different subsystems for coping with different weather conditions resulting in different visual properties, and different road types resulting in different physical and visual properties.

In summary the key aspects of the present invention are

A hierarchical two-step approach consisting of low level base classifiers and a spatial feature generation, as well as a final road terrain classification.

A variety of local properties of the environment used as a basis for spatial feature generation to capture spatial information.

Using ray features, which allow capturing specific spatial information of a more global environment like e.g. properties in a certain angular direction and distance.

Automatic parameter determination and application of the principle of machine learning enabling the system to capture a wide variety of driving environments in real world.

In the following the invention will be described in more detail, and in reference to the attached figures.

DETAILS OF THE INVENTION

Figure 1:
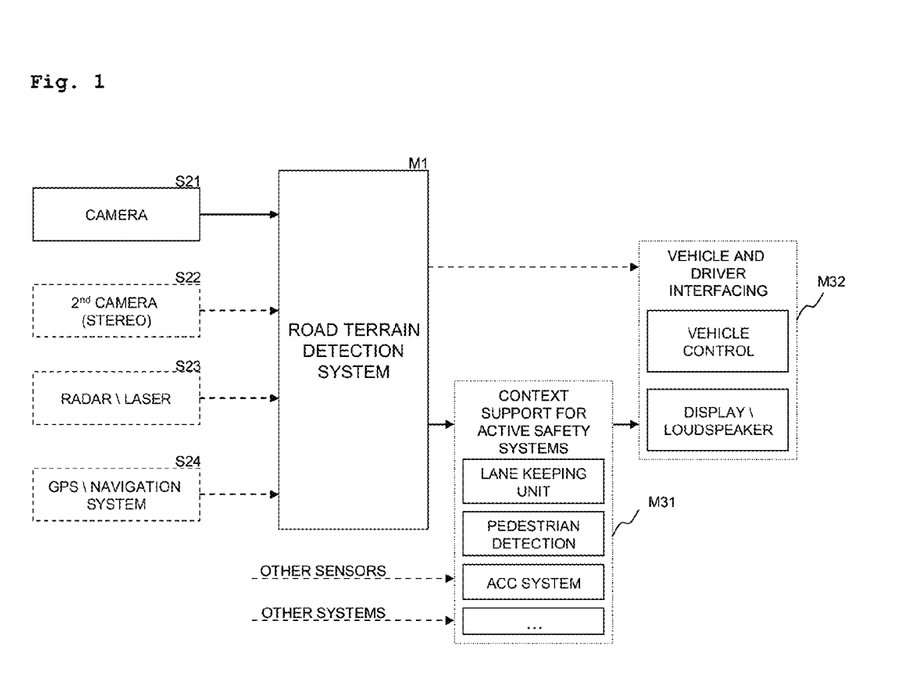
FIG. 1 is a block diagram illustrating one example of a configuration of the present invention used for driver assistance in a car.

The method of the present invention that realizes the road terrain detection can be used to provide context information in active safety systems for driver assistance or control information for the generation of motor commands for autonomous driving (see FIG. 1).

Figure 2:
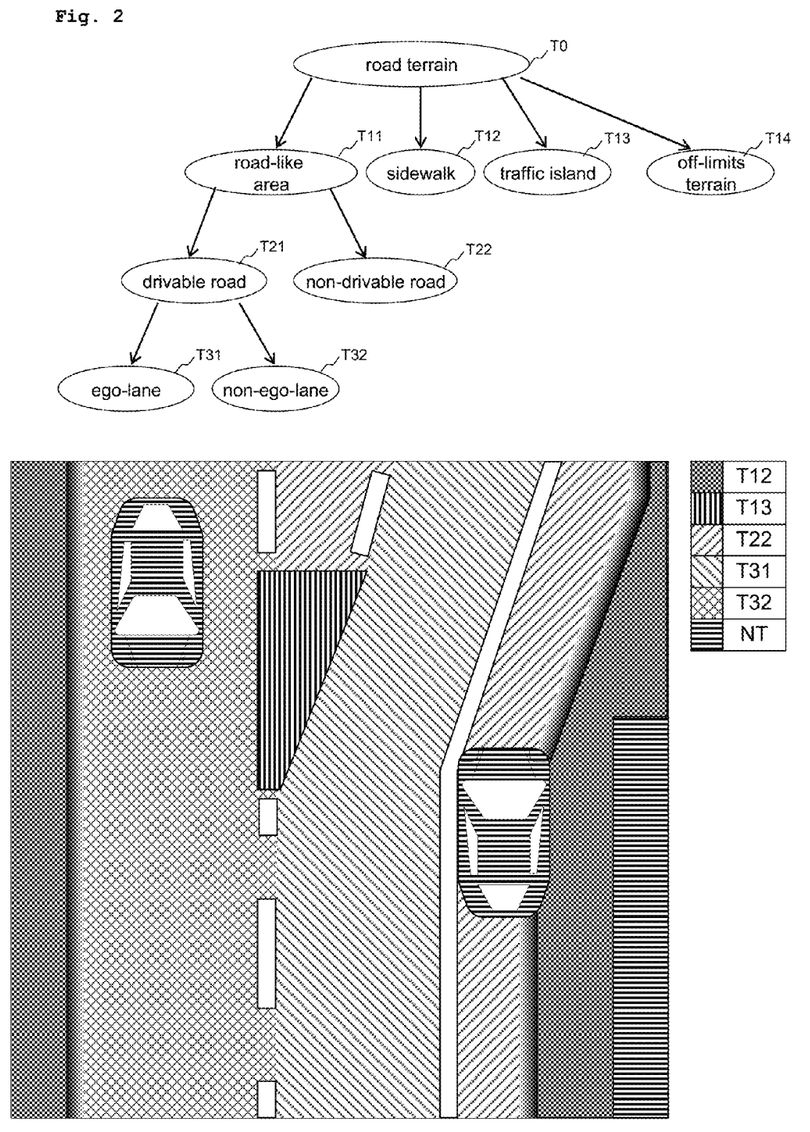
FIG. 2 is a categorization tree to illustrate the hierarchical order and dependence of road terrain categories.

FIG. 2 shows that road terrain (T0) is categorized into road-like area (T11), sidewalk (T12), traffic island (T13), and off-limits terrain (T14). The road-like area consists of drivable-road (T21) and non-drivable road (T22), wherein drivable road is subdivided in ego-lane (T31, the lane the vehicle drives on) and non-ego-lane (T32, the lane the vehicle does not drive on but other vehicles might drive on). Non-road terrain (NT) describes larger, elevated objects that a vehicle in road scenarios encounters and that cannot be potentially driven over. Such objects are e.g. other cars or vehicles, or buildings. The example image in the lower part of FIG. 2 shows a top view of a road scene illustrating the road terrains that are leafs of the categorization tree, which is shown in the upper part of FIG. 2, as well as non-road terrain.

The road terrain classification process is location centric. The locations are called "base points" and reflect specific locations in the environment of the vehicle, like e.g. positions on a metric grid. In a first step, base classifiers are used to transform the sensory input information from at least one sensor into value-continuous spatial representations capturing local properties of the environment. The at least one sensor can be cameras, radars, GPS systems or the like. The local properties that are represented by a value-continuous confidence value could be physical properties (e.g. elevation) or visual properties (e.g. color, texture).

In a higher processing layer a spatial feature generation is performed for each base point. The spatial features capture the distance and/or orientation of the locations in the environment of the vehicle in the value-continuous spatial representation relative to the base points.

The road terrain classification is applied on all base points, in order to infer the road-terrain membership for a spatial area, e.g. for finding the road-like area in front of a vehicle.

The application flow of the road terrain detection system of the present invention shows the above-described three system parts (see left part of block diagram in FIG. 3): base classification (M11), spatial feature generation (M12) and road terrain classification (M13).

Figure 3:
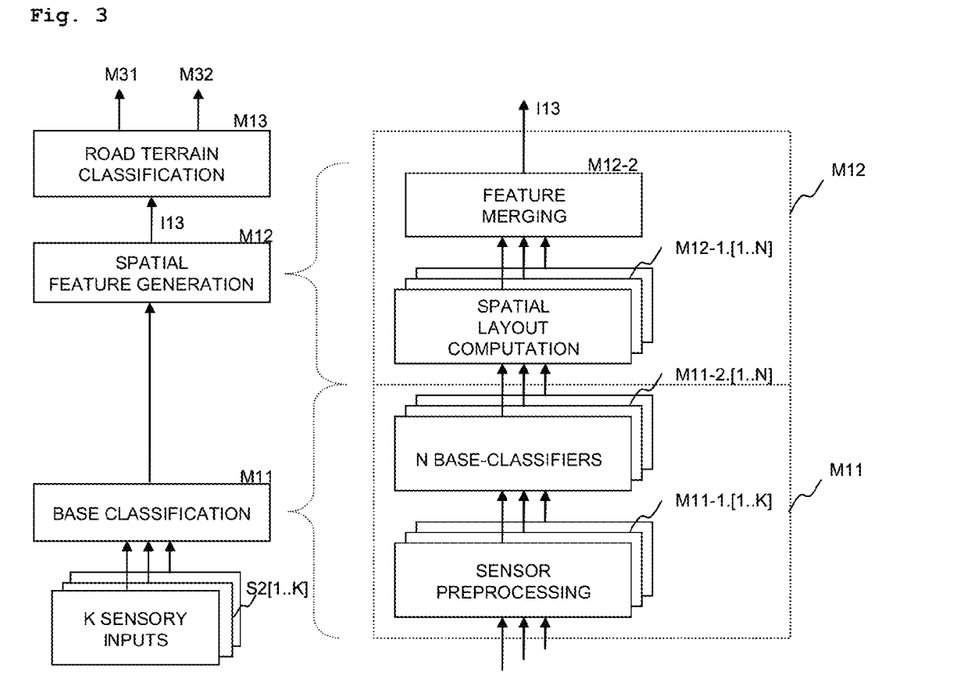
FIG. 3 is a block diagram showing the principal processing modules of the present invention on a coarse level.

Taking at least one sensor input from at least one sensor, the detection system performs at least one base classification. The right part of FIG. 3 shows the road terrain detection system in more detail: The one or more sensor inputs is preferably preprocessed (M11-1) to provide a common spatial representation for different types of sensors. The number N of base classifiers (M11-2) has to be equal or larger than the number of K sensory inputs. For each base classifier output, a spatial layout computation (M12-1) is applied. All the individual features computed on the N different base classifiers are merged (M12-2) to obtain a spatial feature vector (I13) for each base point, before performing the road terrain classification (M13 in left part).

A base classifier (see e.g. M11-2.1 in FIG. 6) has the task to classify the members of a given set of signals into two groups on the basis of whether they have some property or not. Given one input sample the classifier generates one output value that can be in a continuous range of values (e.g. from −1 to 1) which reflects a confidence for class membership. A standard method for classification could be e.g. k-nearest neighbor or Gaussian Mixture Model. Basically the classifier computes the class membership by comparing the similarity of a given input with a reference signal. The difference of the input and the reference can be obtained using an offset measure. This offset can be used to infer directly about the class-membership (e.g. by using a threshold on the offset measure)—this is explicitly not done in the present invention—or the magnitude of the offset measure (which is continuous itself) can be used as (or easily transferred into) a confidence value. If the input signal has a block like dimension, such as an image (which can be interpreted as a set of samples), the output signal is a confidence map.

Figure 4:
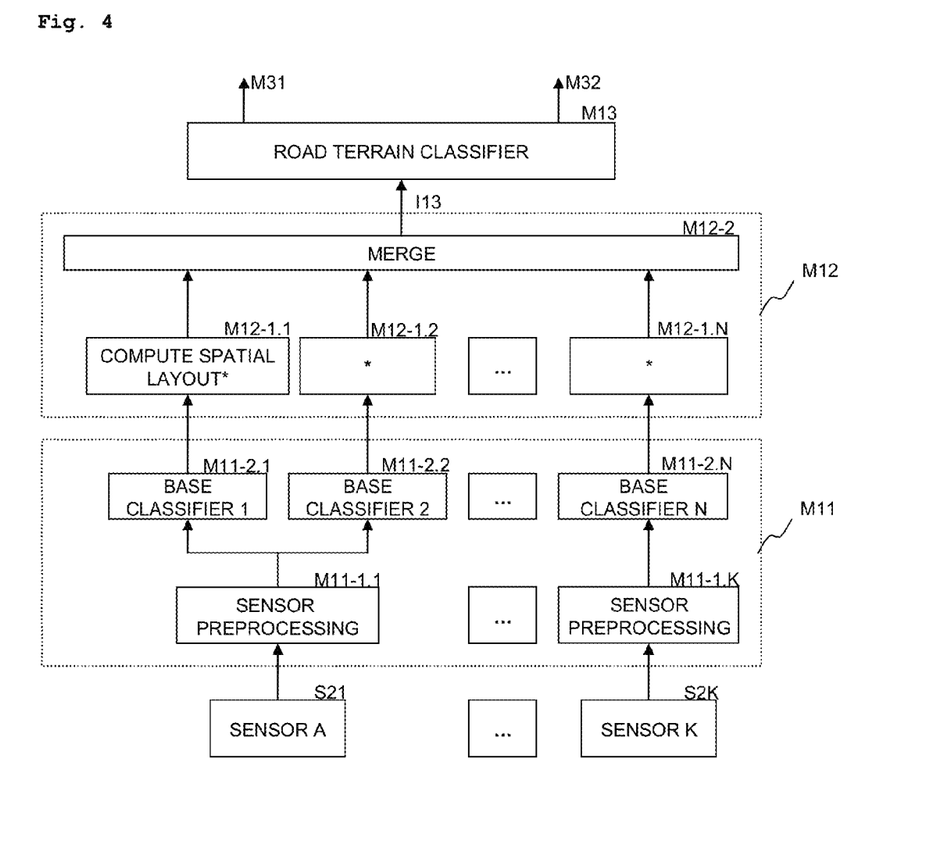
FIG. 4 is a block diagram showing one example of the processing of the present invention with an exemplary module structure.

The block diagram in FIG. 4 shows the base classification with K sensory inputs and N base classifiers in module (M11). Each base classifier (M11-2) generates a map of confidence values for a specific property, wherein each location corresponds to the underlying representation, such as a perspective image or a metric space representation. An entry of this confidence map contains the confidence information about whether a corresponding location (e.g. a pixel position or a cell in a metric space) has a certain property. The confidence map thus represents for each location e.g. in a space representations the confidence about the property of each location. The combination of all confidence maps builds a value-continuous spatial representation. For a specific, preferably preprocessed, sensory input (M11-1.1), several base classifiers (M11-2.1 and M11-2.2) can be applied, resulting in a number of confidence maps. On each confidence map, a spatial layout computation (M12-1) is applied that captures spatial aspects of this confidence map's property. After computing spatial features on every confidence map, the features are merged to a single representation (M12-2). Each location in this representation (I13) contains a spatial feature vector that is used in a road-terrain classifier (M13) that has been trained for a certain terrain category.

Figure 5:
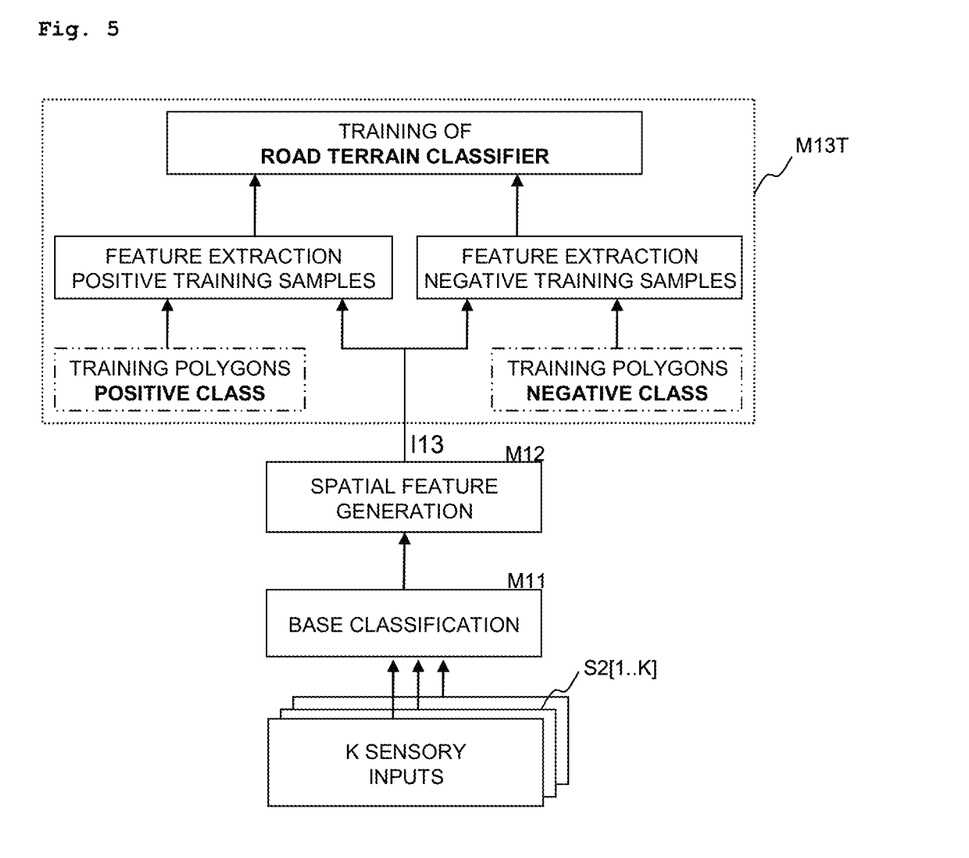
FIG. 5 is a block diagram illustrating one example of an application flow for training a road terrain classifier as a part of the present invention.

In order to train the road terrain classifier (see M13T in FIG. 5) for a specific terrain category, positive and negative samples have to be extracted from the spatial features to build a positive and negative training dataset. The locations of these samples correspond to the already mentioned base points of the system. For example, for camera images the sample selection could be done by using polygonal annotations for a certain terrain type (e.g. annotated regions for ego-lane and non-ego-lane). The pixel locations inside such annotated regions correspond to areas where base points can be extracted and can be used to build the training dataset.

Figure 6:
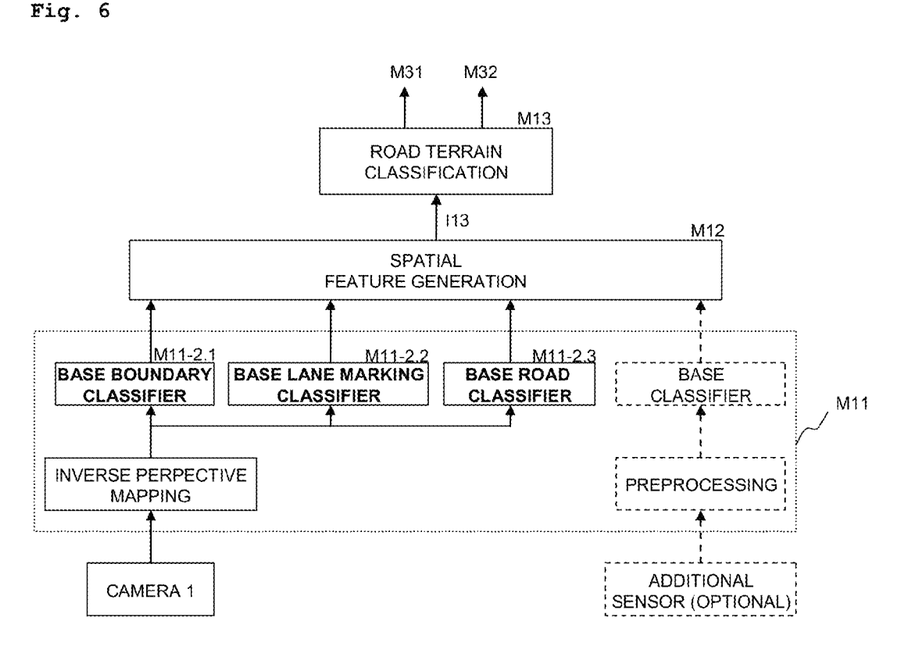
FIG. 6 is a block diagram illustrating one example of an application flow illustrating the structure of the base classification as a part of the present invention.

In FIG. 6 an exemplary base classification using a camera as the at least one sensor providing sensory input for the purpose of road terrain detection (for the category T11 "road-like area" and subcategories) is shown. Inverse Perspective Mapping (compare e.g. 'H. Mallot, H. Bülthoff, J. Little, "Inverse perspective mapping simplifies optical flow computation and obstacle detection", Biological cybernetics, 1991') can be used to convert the perspective camera image into a metric image representation. For extracting local properties, three base classifiers are used: These are base boundary classifier (M11-2.1), base lane marking classifier (M11-2.2) and base road classifier (M11-2.3).

The base boundary classifier (M11-2.1) is specialized on detecting boundaries between the road-like area and adjacent regions like e.g. sidewalks, traffic islands, off-limits terrain, or non-road terrain based on the metric image representation. This base boundary classifier generates low confidences on road-like area and high confidences at locations that correspond to boundaries like, e.g. curbstones.

For the base lane marking classifier (M11-2.2), techniques such as e.g. presented in US 2007/0198146 A1 can be applied to generate a confidence map having a high confidence at locations corresponding to lane markings and low confidences on road terrain (i.e. road-like area, sidewalk, traffic island, off-limits terrain).

The base road classifier (M11-2.3) is specialized to generate high confidences on the road-like area and low confidences on non-road terrain.

Performing a spatial feature generation (M12) and a specialized road terrain classification (M13) on the value-continuous spatial representation from this base classification allows extracting road-like area or the ego-lane, depending on what kind of training data has been used.

Exemplary processing results for "road-like area" detection based on the invention described above are given in FIG. 7. Scenario 1 shows a situation where the ego-vehicle encounters a scene where the ego-lane is separated by lane markings on the left and right side of the vehicle. Scenario 2 shows a situation where the ego-vehicle encounters a scene where the ego-lane is separated by lane markings on the left side and a curbstone on the right side. Scenario 3 shows a situation where the ego-vehicle encounters a scene where the ego-lane is not separated from other lanes on the left and a curbstone limits the ego lane on the right side.

Figure 7:
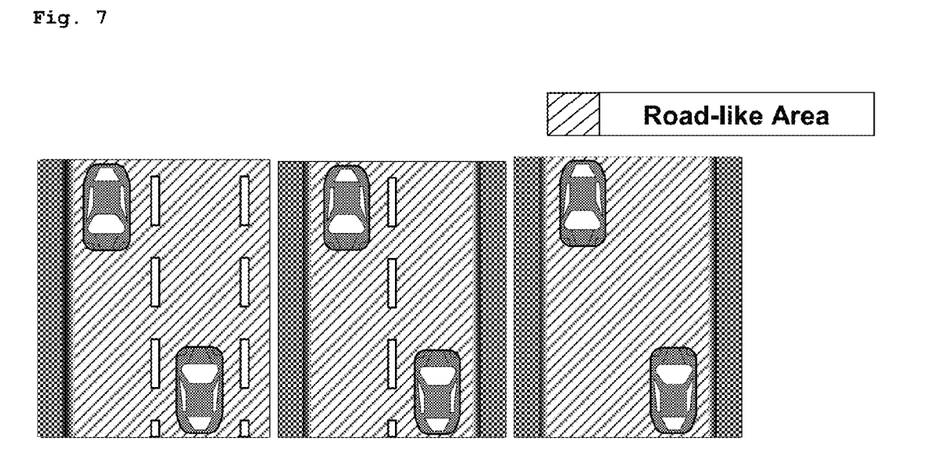
FIG. 7 shows three exemplary top view road-scenes illustrating scenarios for road-like area detection.
Figure 8:
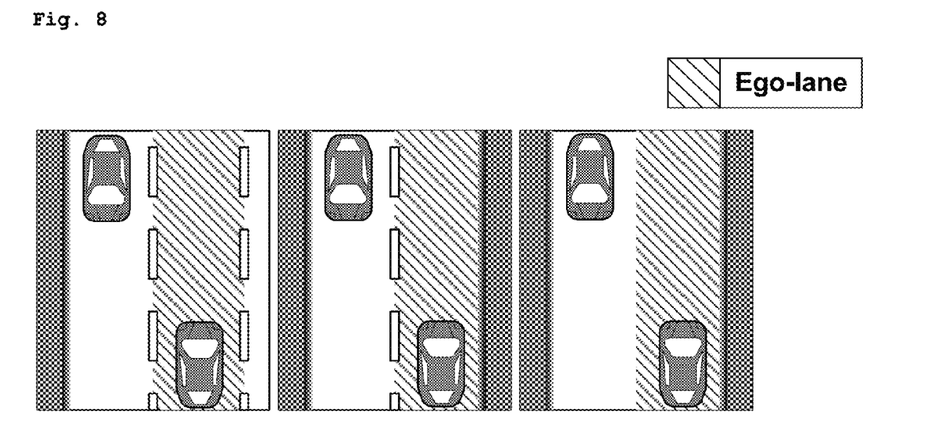
FIG. 8 shows three exemplary top view road-scenes illustrating scenarios for ego-lane detection.

Exemplary processing results for "ego-lane" detection based on the invention described above are given in FIG. 8 for the scenarios already shown in FIG. 7.

Figure 9:
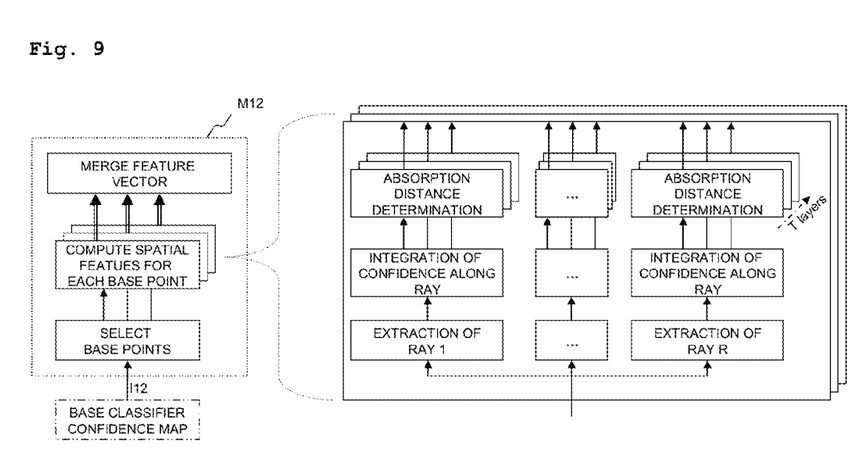
FIG. 9 is a block diagram showing an exemplary application flow for spatial feature generation.
Figure 10:
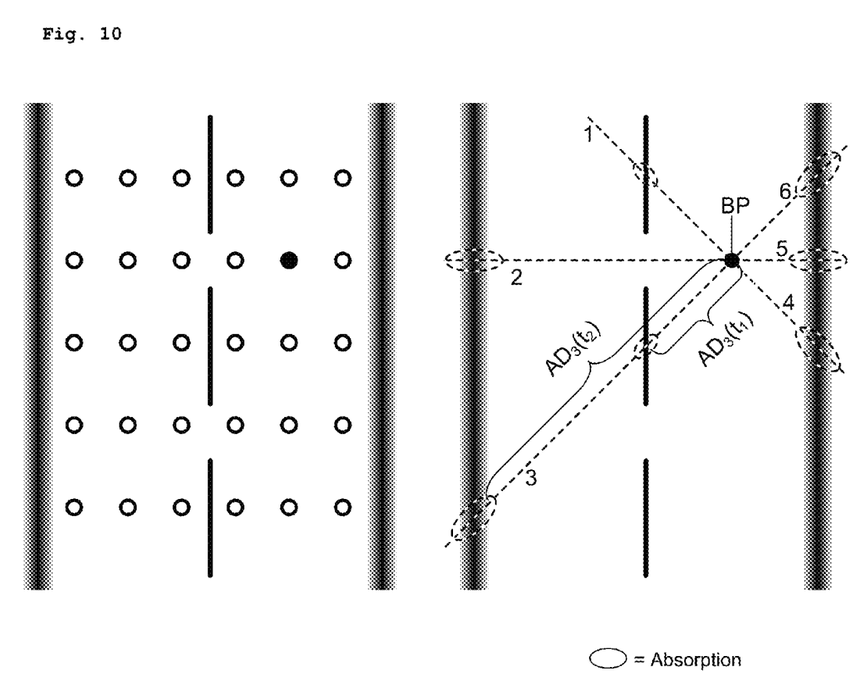
FIG. 10 illustrates a procedure for spatial feature generation from an exemplary confidence map reflecting a two-lane road with lane markings in the center and curbstones on the left and right side.

One possible implementation for spatial feature generation (M12) is illustrated in FIG. 9 to FIG. 12. For this example there is assumed only one base classifier that is applied to the metric representation of a camera image (compare again the above-cited paper by H. Mallot et al.) resulting in a confidence map as shown in FIG. 10 (right part). The exemplary base classifier has the ability to generate high confidences on curbstones and lane markings and low confidences on road terrain.

The left part of FIG. 9 shows the general processing steps for feature generation: Taking a confidence map from a base classifier as input (I12), for a defined number of base points (BP) in the metric representation, spatial feature vectors can be extracted and subsequently merged. The distribution of base points is in this example defined as a grid as shown in FIG. 10 (left part). The spatial layout with respect to the confidence map is captured at different base points by vectors, which are called rays.

A ray includes all confidence values describing a directed line, with a certain angular orientation, starting from a specific base point and ending at the border of the metric representation. To convert this information into a defined number of feature values, the integral of the confidence values along the ray is computed, which can be interpreted as absorption of confidences along the ray. By defining a certain number T of absorption thresholds, the absorption distances $AD(t_i)$, i.e. the locations where the integral value reaches a certain threshold $t_i$, are obtained as spatial features. The generation of the spatial features for a number of R ray orientations is performed for each base point.

The detailed spatial feature computation steps are given in the right part of FIG. 9. There is illustrated how multiple rays for a specific base point result in R*T absorption distances. The absorption distances serve as spatial features for the road terrain classification, because they describe the spatial layout of the environment, captured in the confidence maps of the properties, relative to the predefined base points.

In FIG. 10 (right part) the spatial layout computation is exemplary shown for one base point on a simplified confidence map (example for I12, dark color indicates high confidences for boundary) for a two-lane road with lane markings in the center and curbstones on the left and right side. Spatial features are extracted along six rays numbered counter-clockwise (1-6). For the third ray (3) additionally the absorption distances $AD_3(t_1)$ and $AD_3(t_2)$ for two thresholds are illustrated.

Figure 11:
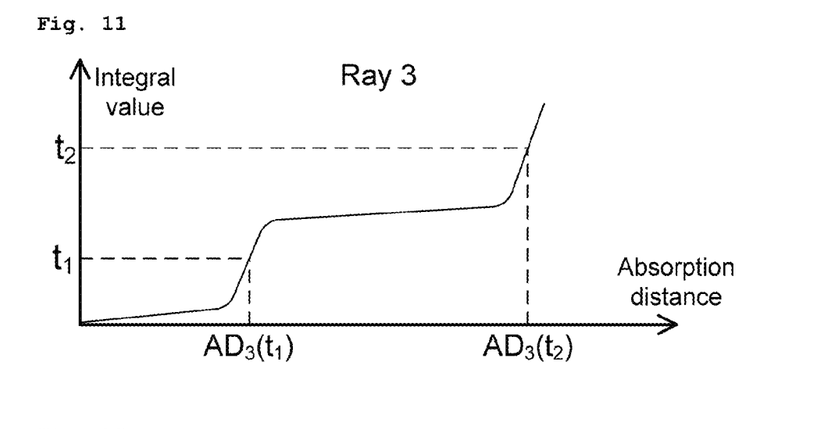
FIG. 11 shows a principal sketch of the integral over the third ray from FIG. 10.

The graph in FIG. 11 shows a principal sketch of the integral over the ray (3) given the confidence map mentioned above. The thresholds $t_1$ and $t_2$ lead to absorption distances that correspond to the distances from the base point to a lane marking $AD_3(t_1)$ and the left curbstone $AD_3(t_2)$.

Figure 12:
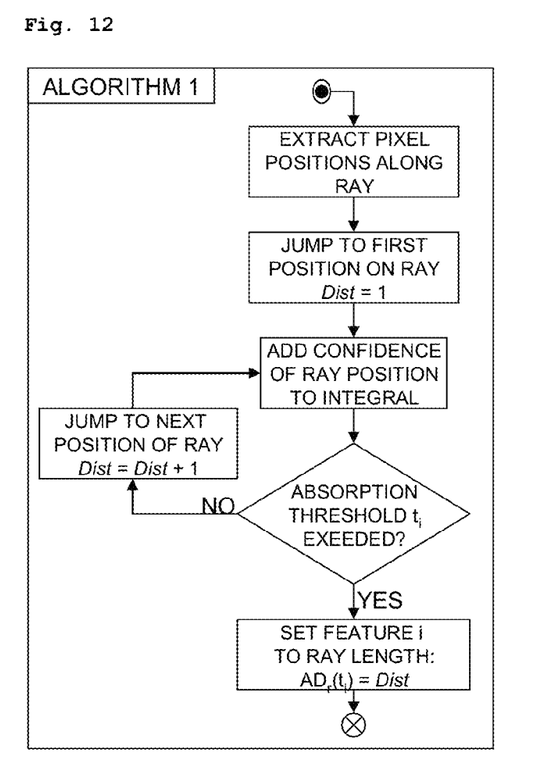
FIG. 12 is a flow chart illustrating an exemplary extraction algorithm for spatial feature generation given one ray and one threshold.

The flow diagram in FIG. 12 shows a possible implementation of the algorithm mentioned above for calculating the absorption distance given one ray and a certain threshold $t_i$.

Instead of the integration-based absorption distances described in FIG. 9 to FIG. 12, also other techniques can be used to compute the spatial features. For example, instead of extracting threshold-based distances, the integral can be analyzed for other properties, like e.g. the shape of the integral. As another example following the idea of ray extraction, the gradient of the raw confidence values along the ray could serve as feature value.

Figure 13:
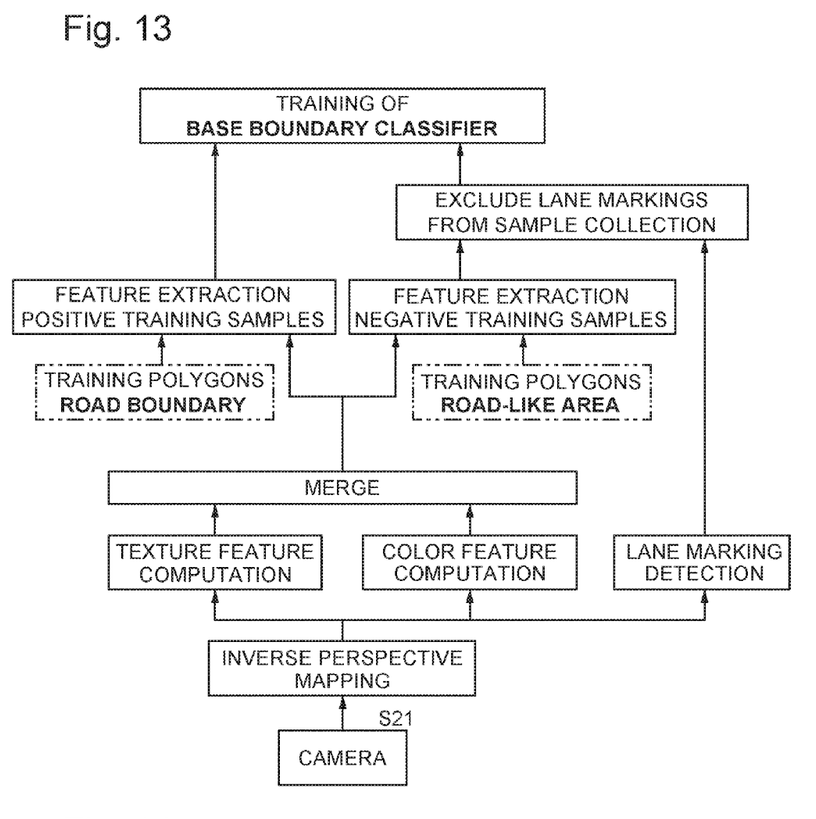
FIG. 13 is a block diagram showing one exemplary application flow for training a visual boundary classifier used as a base classifier for the present invention.

FIG. 13 shows the overall system for training a base boundary classifier specialized on road boundaries. The trained classifier can serve as base classifier (M11-2.1) for a road terrain detection system as outlined in FIG. 6. Starting from e.g. a camera sensor, at first inverse perspective mapping is applied to the input image to obtain a metric image representation. Based on this representation features (e.g. color and texture) are computed and merged together to form a feature vector. In order to extract positive and negative training samples to build a dataset for training the base classifier, information about the class membership of the feature vectors is needed. For example, this information can be provided by the annotation of input images with polygonal regions delineating road boundary as positive class and road-like area as negative class (see FIG. 14).

The system includes a lane marking detection, in order to exclude the training samples containing lane markings from the training data. This training architecture allows focusing the base classifier on important boundaries, such as curbstones, instead of covering also lane markings in the training set that can be detected with standard techniques. The training results in a base classifier that provides high confidences for locations where the appearance indicates the existence of a road boundary, i.e. the transition from road-like area to a sidewalk, a traffic island, off-limits terrain or non-road terrain. It is important for the use of this invention that the base classifier generates low confidences on road-like area. In this way, the proposed training results in a crisper base boundary classifier as compared to state-of-the-art training. Therefore, an improved road terrain detection quality of the overall road-terrain detection system is possible.

Figure 14:
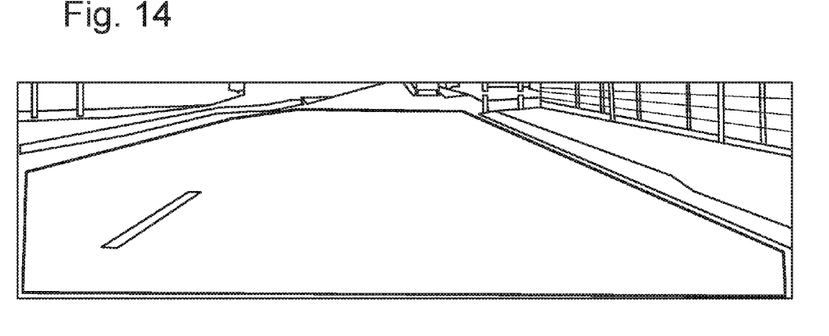
FIG. 14 shows an exemplary polygonal image annotation.

FIG. 14 shows an exemplary polygonal image annotation. The white-framed polygons delineate image regions containing road-boundary and the black-framed polygon delineates an image region containing road-like area.

APPLICATION AREAS OF THE INVENTION

The invention is intended to be used for the following driver assistance systems and autonomous driving applications:

Lane keeping support for arbitrary (unmarked) roads.

Traffic jam assist combining lane keeping support and estimation of distance to preceding vehicle for lateral and longitudinal support.

Emergency braking if the road in front is not free, i.e., it contains other vehicles or any type of object.

Improved Autonomous Cruise Control (ACC) by identifying the preceding car from multiple candidates based on the extracted ego-lane.

Improved collision warning system by judging the relevance of a detected pedestrian (or other object) based on its relation to the proposed road terrain detection.

Improved object detection for driver assistance systems by modifying the object detection process based on the knowledge of the detected road terrain.

The invention claimed is:

1. A road-terrain detection method for driver assistance systems, wherein the road-terrain detection method comprises
   sensing the environment of a vehicle with at least one sensor;
   transforming a sensor signal from the at least one sensor into at least one confidence map of local properties of the environment by using at least one base classifier;
   generating, for base points on the at least one confidence map, each reflecting a specific location in the environment of the vehicle, spatial features for the local properties based on the at least one confidence map; and
   classifying, based on the generated spatial features, locations in the environment of the vehicle to a certain category of road terrain corresponding to a type of surface of a road, wherein the generation of a spatial feature for a specific location in the environment of the vehicle comprises
   extracting a ray, wherein a ray is defined as a directed line with a certain angular orientation starting from the location in the environment, and
   analyzing confidence values along the ray to extract spatial feature.

2. The method according to claim 1, wherein the at least one sensor is one or more cameras, radars, laser scanners or GPS\navigation systems.

3. The method according to claim 1, wherein based on the classified locations in the environment a visual or acoustic signal is generated or an effector of the vehicle is operated.

4. The method according to claim 3, wherein the effector comprises at least one of a steering wheel, an accelerator, or a brake.

5. The method according to claim 1, wherein the method applied for a specific road terrain is automatically parameterized by using positive and negative samples, which are given by training regions.

6. The method according to claim 5, wherein the specific road terrain term comprises at least one of "road-like area", "drivable road", "ego-lane", "non-ego-lane", "non-drivable road", "sidewalk", "traffic island", or "off-limits terrain".

7. The method according to claim 5, wherein the training regions comprise polygons.

8. The method according to claim 1 comprising a step of sensory preprocessing for all sensor signals to obtain a common representation of the environment.

9. The method according to claim 8, wherein the sensory preprocessing is an inverse perspective mapping of a camera image to get a metric image representation.

10. The method according to claim 1, wherein the analysis of the confidence values along the ray is performed by
    integrating the confidence values along the ray;
    extracting the ray length, at which the integral exceeds an absorption threshold, which is a certain numeric value.

11. The method according to claim 10, wherein for a specific location in the environment at least one ray and at least one absorption threshold is used to generate a feature vector that encodes the relative position to a local property given by a confidence map.

12. The method according to claim 1 comprising a base classifier for road classification that generates a confidence map, wherein locations in the environment that correspond to a road-like area have high confidence values.

13. The method according to claim 1 comprising a base classifier for lane marking detection that generates a confidence map, wherein locations in the environment that correspond to lane markings have high confidence values.

14. A road-terrain detection system for driver assistance systems, the road-terrain detection system being adapted to perform a method according to claim 1.

15. A road-terrain detection system for driver assistance systems, the road-terrain detection system being adapted to
    sense with at least one sensor the environment of a vehicle;
    transform at least one sensor signal from at least one sensor into at least one confidence map of local properties of the environment by using at least one base classifier;
    generate, for base points on the at least one confidence map, each reflecting a specific location in the environment of the vehicle, spatial features for local properties based on the at least one confidence map; and
    classify, based on the generated spatial features, locations in the environment of the vehicle to a certain category of road terrain corresponding to a type of surface of a road, wherein the generation of a spatial feature for a specific location in the environment of the vehicle comprises
    extracting a ray, wherein a ray is defined as a directed line with a certain angular orientation starting from the location in the environment, and
    analyzing confidence values along the ray to extract spatial feature.

16. The system according to claim 15, wherein the road terrain detection system can select one out of multiple road terrain classification outputs as a system output, in order to internally have different subsystems for coping with
    different weather conditions resulting in different visual properties;
    different road types resulting in different physical and visual properties.

17. A land vehicle, being provided with a system according to claim 15.

18. A road-terrain detection method for driver assistance systems, wherein the road-terrain detection method comprises
    sensing the environment of a vehicle with at least one sensor;

transforming a sensor signal from the at least one sensor into at least one confidence map of local properties of the environment by using at least one base classifier;

generating, for base points on the at least one confidence map, each reflecting a specific location in the environment of the vehicle, spatial features for the local properties based on the at least one confidence map; and classifying, based on the generated spatial features, locations in the environment of the vehicle to a certain category of road terrain corresponding to the type of surface of the road, wherein the method comprises a base classifier for visual boundary classification, in order to find visual features that discriminate a road boundary from a road-like area, wherein the method includes feature generation, uses a positive training set with polygonal training regions for the road boundary, and uses a negative training set with polygonal training regions for road-like area excluding areas with lane-markings.

19. The method according to claim 18, wherein the visual features comprise curbstones.

20. The method according to claim 18, wherein feature generation comprises generating at least one of color, texture, appearance, flow, or depth.

21. A non-transitory computer-readable medium encoded with instructions that, when run on a computing device in a land vehicle, perform a method, the method comprising:

sensing the environment of a vehicle with at least one sensor;

transforming a sensor signal from the at least one sensor into at least one confidence map of local properties of the environment by using at least one base classifier;

generating, for base points on the at least one confidence map, each reflecting a specific location in the environment of the vehicle, spatial features for the local properties based on the at least one confidence map; and classifying, based on the generated spatial features, locations in the environment of the vehicle to a certain category of road terrain corresponding to a type of surface of a road, wherein the generation of a spatial feature for a specific location in the environment of the vehicle comprises extracting a ray, wherein a ray is defined as a directed line with a certain angular orientation starting from the location in the environment, and analyzing confidence values along the ray to extract spatial feature.

22. A road-terrain detection system for driver assistance systems, the road-terrain detection system being adapted to sense the environment of a vehicle with at least one sensor;

transform a sensor signal from the at least one sensor into at least one confidence map of local properties of the environment by using at least one base classifier;

generate, for base points on the at least one confidence map, each reflecting a specific location in the environment of the vehicle, spatial features for the local properties based on the at least one confidence map; and classify, based on the generated spatial features, locations in the environment of the vehicle to a certain category of road terrain corresponding to the type of surface of the road, wherein a base classifier is provided for visual boundary classification, in order to find visual features that discriminate a road boundary from a road-like area, wherein the system is adapted to include feature generation, use a positive training set with polygonal training regions for the road boundary, and use a negative training set with polygonal training regions for road-like area excluding areas with lane-markings.

* * * * *